May 11, 1926.

F. PHARISS

GREASE GUN

Filed July 6, 1923

Inventor
Floyd Phariss.
By Lancaster and A. Olivier
Attorneys

May 11, 1926.
F. PHARISS
1,583,993
GREASE GUN
Filed July 6, 1923
2 Sheets-Sheet 2
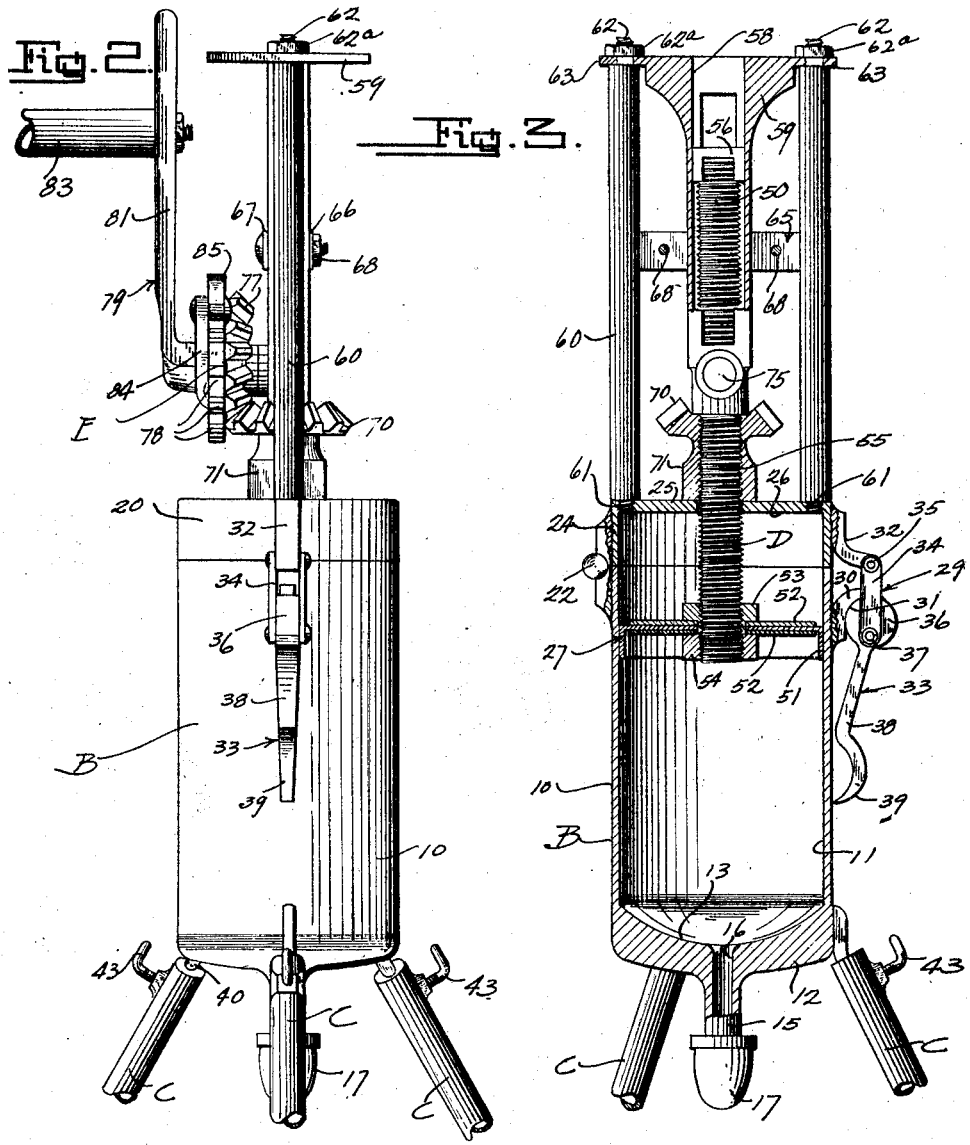
Inventor
Floyd Phariss.
By Lancaster and Allwine
Attorneys Patented May 11, 1926.

1,583,993

UNITED STATES PATENT OFFICE.

FLOYD PHARISS, OF WAURIKA, OKLAHOMA.

GREASE GUN.

Application filed July 6, 1923. Serial No. 649,922.

This invention relates to improvements in grease guns.

The primary object of this invention is the provision of a grease gun which is particularly well adapted for use in connection with the lubricating of heavy machinery, such as heavy duty tractors, and in which hard grease lubricant may be used and easily fed to the parts to be lubricated with very little exertion.

A further object of this invention is the provision of a grease gun of the above mentioned character which embodies a relatively simple and compact association of details, which will permit the effective handling of grease, both with respect to the filling of the grease gun and the dispensing of grease therefrom.

A further object of this invention is the provision of a grease gun of the above mentioned character, which embodies a receptacle portion which may be easily and quickly opened for refill or inspection purposes.

A further object of this invention is the provision of an operating mechanism for the plunger of the grease gun, which will permit of movement of the plunger in the easiest manner.

Other objects and advantages of this invention will be apparent during the course of the following detailed description.

In the accompanying drawings, forming a part of this specification, and wherein similar reference characters designate corresponding parts throughout the several views, Figure 1 is a side elevation of the improved grease gun.

Figure 2 is an elevation of the improved grease gun, taken substantially at right angles to the view illustrated in Figure 1 and showing cooperating details of the same.

Figure 3 is a fragmentary longitudinal cross sectional view, taken through the improved grease gun, showing certain novel operating features thereof.

Figure 1:
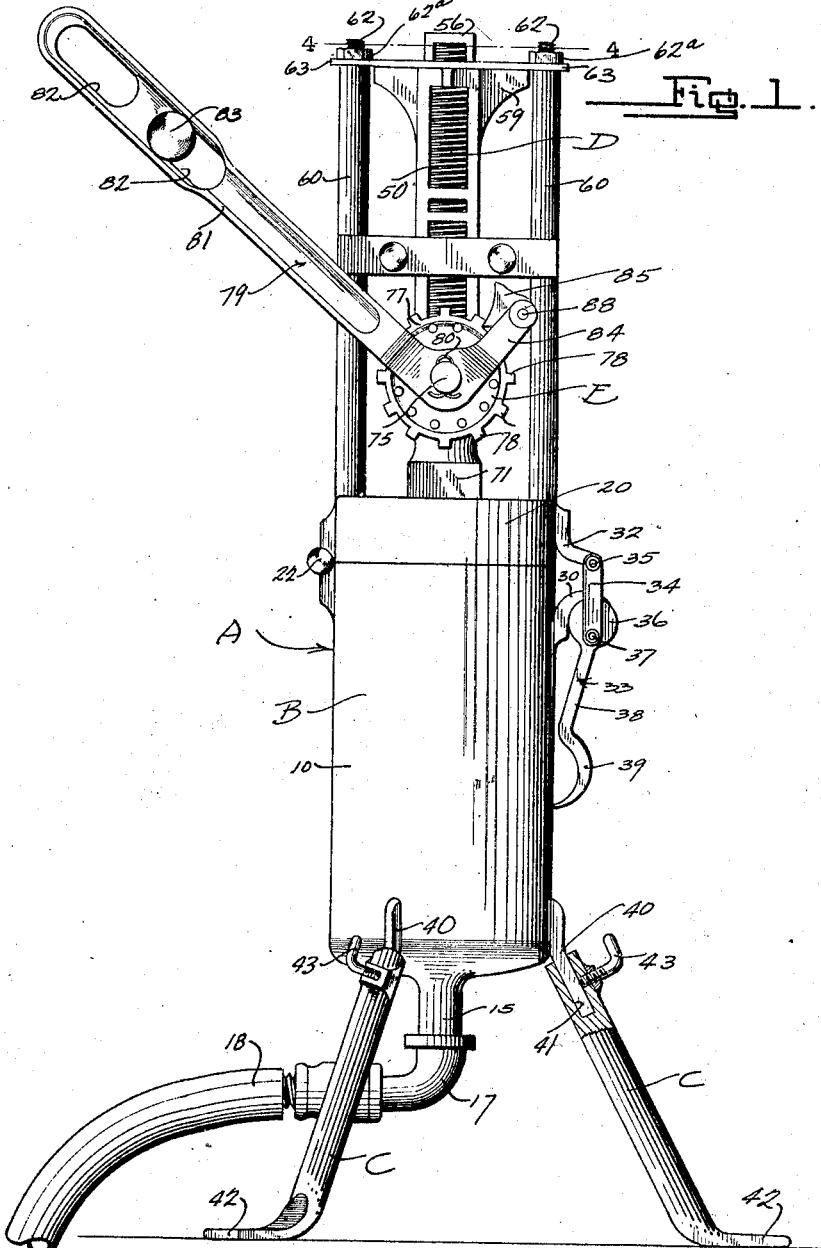
Figure 4:
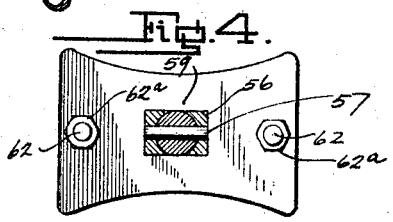
Figure 4 is a fragmentary cross sectional view, taken substantially on the line 4—4 of Figure 1.

With reference to the drawings, wherein for the purpose of illustration is shown but the preferred embodiment of the improved grease gun, the letter A may generally designate the grease gun, which may include a receptacle portion B, supporting legs C, plunger mechanism D, and means E for operating the plunger mechanism D.

Referring to the receptacle portion B, the same may include the main container portion 10, entirely open at its top, and providing a grease chamber 11 therein. The container portion 10 includes a bottom wall 12 having an inner concaved surface 13, and axially provided with a depending attaching pipe 15 providing a passageway 16 through which the grease may be dispensed from the chamber 11. The lower end of the pipe portion 15 may be suitably screw threaded, if desired, for receiving an angle fitting 17, to which a flexible hose 18 may be connected in any approved manner, and thru which hose the grease may be dispensed so that said grease may be fed to the desired location.

A cap portion 20 is preferably provided as a part of the receptacle B; which is preferably of the same diameter as the container portion 10, and which is hingedly connected to the latter, as by hinge means 22 exteriorly provided upon the container and cap portions 10 and 20 respectively. The cap 20 is provided with an annular side wall portion 24, and a top wall 25, the latter of which is adapted to support the plunger mechanism D, and which provides a compartment 26 therebelow, into which the plunger or valve head 27 of the plunger mechanism D may fit when the cap 20 is to be swung open, and as will be subsequently described in detail.

In connection with the retention of the cap 20 upon the retainer portion 10, it is preferred to provide a releasing device 29, which includes a substantially J-shaped hook 30, attached to the container portion 10 and providing an arcuate seat 31 facing downwardly. A bracket 32 is preferably rigidly fixed to the arcuate side wall 24 of the cap 20, and at the outer end pivotally supports a locking lever 33 as through a link connection 34. The hook 34 is pivotally connected, as at 35, to the outer end of the bracket 32. The lever 33 includes a cam or disc 36, which is eccentrically pivoted to the other end of the link 34, as at 37. The lever 33 furthermore includes a downwardly extending arm 38 provided with a finger engaging hook 39 at its free end. As to the operation of the mechanism 29, when the lever 33 is held manually upward, the disc 36 may be easily swung outwardly from the arcuate seat 31 of the bracket, so that the lid 20 may be swung open. When it is desired to securely clamp the lid 20 upon the container 10, as to effectively seal the body connection therewith against liability of leakage of lubricant therethrough, the cap 20 is placed upon the container 10 and by lifting the lever 33 upwardly, the disc 36 may be moved beneath the bracket 30 into the seat 31. By manually pushing downward upon the arm 38 of the lever 33, the disc 36 will operate in the nature of a cam against the arcuate seat 31, and due to the eccentric connection 37 therewith, it is obvious that the lid 20 will be drawn securely and effectively down over the container 10. When the arm 38 is swung inwardly against the side of the container 10, the latch mechanism 29 is locked against liability of accidental opening.

Referring to the legs C, it is preferred to provide leg supporting extensions 40 upon the exterior of the lower end of the container portion 10, said extensions 40 extending in diverging relation from the lower end of the container portion 10, and being polygonal shaped in cross section. Any approved number of them may be provided. The legs C are preferably cylindrical shaped in formation, and may be tubing, having socket openings 41 in their upper ends adapted to receive the extensions 40 therein. At their lower ends the legs C are each flattened, as at 42, and outturned in a plane substantially at an acute angle with respect to the axis of the leg. Substantially L-shaped clamping screws 43 are preferably provided upon the upper end of each leg C, which may be clamped into engagement with the extension 40 for reception therein, for the effective positioning of the leg C upon the extension 40. The legs C when so attached to the extensions 40 extend in diverging relation from the container portion 10, and the flattened lower ends 42 thereof are outturned in a common plane for supporting the grease gun A on a vertical axis. The legs C are of course detachable from the container extension 40, as a feature of compactness for storage and transportation.

Referring to the plunger mechanism D, the same preferably includes a screw threaded stem 50, which, at its lower end has the plunger or valve head 27 detachably fixed thereon. This plunger or valve head 27 preferably includes a flexible body portion 51, preferably of leather, which may be clamped intermediate metal discs 52, as by means of upper and lower nuts 53 and 54 respectively. The screw threaded stem 50 is adapted for axial movement with respect to the receptacle B, extending thru an opening 55 in the top 25 of the cap 20.

At its upper end, the exteriorly screw threaded stem 50 is provided with a polygonal shaped head 56, which may be rectangular in cross section and secured to the stem 50 as by means of a transverse pin 57. This head 56 is longitudinally slidable in a vertical guideway 58 of a supporting frame 59, the guide way 58 being of rectangular cross section so that while the head 56 may slide longitudinally therein, it cannot move laterally therein. This prevents rotation of the screw threaded stem 50, so that the same may only be fed longitudinally with respect to the receptacle B by the operating means E, and as will be subsequently described. The supporting frame 59 is carried by the top 25 of the cap 20, as by means of a pair of standards 60. The standards 60 at their lower ends are reduced and screw threaded, as at 61, and detachably engage in the top 25 of the cap 20. At their upper ends, the standards 60 are also reduced and exteriorly screw threaded, as at 62, and receive the oppositely extending flanges 63 of the frame thereon and nuts 62$^a$, whereby said frame may be supported intermediate the standards 60 and out of direct contact with the cap 20. The guide passageway 58 may be open at the top of the frame 59, and extends downwardly through said frame between said standards 60. A clamp 65 may be provided upon the means which supports the stem 50; which clamp includes the side plates 66 and 67 extending in abutting relation transversely on each side of the frame 59 and standards 60, bolts 68 preferably connecting said plates 66 and 67 so that they may be clamped securely to the standard 60 and the frame 59 for relatively stabilizing the same.

Referring to the operating means E whereby the plunger head 27 may be fed along the grease chamber 11 for dispensing the same therefrom, the same preferably includes a gear 70 of the bevelled type, having a body portion 71 depending therefrom in screw threaded engagement with the plunger stem 50. The body portion 71 rests directly upon the top wall 25, and immediately below the frame 59, substantially as is illustrated in Figure 3 of the drawings. A shaft 75 is preferably fixedly supported by the frame 59, extending substantially at right angles with respect to the screw threaded shank 50 immediately above the bevelled gear 70. This shaft 75 rotatably receives a bevelled gear 77 thereon, which is adapted for meshing relation with the gear 70 when disposed upon said shaft. The bevelled gear 77 is of somewhat novel formation, and at its outer periphery is provided with substantially rectangular shaped teeth 78. Outwardly of the gear 77 and also rotatable upon the shaft 75, an operating lever 79 may be disposed, the gear 77 and operating lever 79 being preferably maintained upon the shaft 75 as by a cotter pin 80. The lever 79 from its pivotal connection with the shaft 80 is preferably provided with a lever arm portion 81 of any approved length, which at its outer end may have longitudinal slots 82 therein for the adjustable reception of a hand grip 83. From the pivotal connection 80, the lever 79 is also provided with an extension 84, disposed substantially at right angles to the run of the arm portion 81, and which at its outer end pivotally supports a pawl or dog 85 of a nature to associate with the teeth 78 in the rotating of the gear 77 in either direction about its shaft 75.

Referring to the operation of the grease gun A, for dispensing grease therefrom, the dog 85 is set, so that the same drops into a notch intermediate adjacent teeth 78, substantially as is illustrated in Figure 1 of the drawing. Upon downward pressure upon the operating lever 75, it is obvious that the gear 77 will be rotated, which will also rotate the gear 70, and as the latter is in screw threaded engagement with the stem 50, said stem 50 will be fed, together with its plunger head 27 downwardly within the container chamber 11, so that grease may be dispensed through the tubing 18 to any desired location. The provision of the pawl 85 enables the operator to oscillatively utilize the operating lever 79, so that the plunger 27 may be fed downwardly within the container chamber 11 by succeeding downward strokes of the operating lever 79. This is an important feature as not much manual exertion is necessary for operating the grease gun in this manner. If it were necessary to move the plunger head 27 downwardly within the container 11, by entire rotation of the operating lever 79, it is obvious that the manual exertion would be considerably greater upon the upstroke of said lever than upon the downstroke. Very great pressure is required to feed hard grease into the parts to be lubricated upon heavy machinery, so that the operating connection of the pawl 85 with the teeth 78 is important. Merely by throwing the pawl 85 upon its pivot 88, the same may be set, so that the gear 70 may be rotated for moving the stem 50 upwardly, and thus withdrawing the plunger head 27 upwardly within its grease chamber 11.

From the foregoing description of this invention, it is apparent that a grease gun has been provided, the parts of which are compactly arranged so that the same may occupy but a relatively small space within a tool box. The features by which the grease gun may be operated are novel to a great extent. When the cap 20 is to be removed or swung open from the container portion 10, the plunger head 27 is, of course, drawn upwardly into the cap compartments 26 by the operating means. This is a relatively simple operation and merely by opening the latch mechanism 29, the grease chamber 11 is exposed for refill or inspection purposes.

Various changes in the shape, size and arrangement of parts may be made to the form of invention herein shown and described, without departing from the spirit of the invention or the scope of the claims.

I claim:

1. In a grease gun the combination of a receptacle portion providing a compartment therein, a closure for said receptacle to close the compartment thereof, a plunger head slidable in the receptacle compartment, a screw threaded stem connected with said plunger head and vertically extending in slidable relation through said closure exteriorly of the receptacle compartment, standards supported in upwardly extending relation by the closure, an elongated guide frame carried by the upper ends of said standards extending in axially aligning relation with said screw threaded stem, said guide frame having a passageway therethrough into which the upper end of the screw threaded stem extends, means slidably connecting the screw threaded stem in said passageway of the guide frame to prevent rotation of the screw threaded stem, said guide frame being supported by said standard so that the lower end thereof is in spaced relation above closure, a gear rotatably supported in screw threaded engagement with said screw threaded stem between the lower end of said guide frame and the closure in movable abutment with the closure and lower end of the guide frame to prevent relative movement therebetween longitudinally of the screw threaded stem, and means for rotating the said gear to feed the screw stem and plunger longitudinally of the receptacle.

2. In a grease gun the combination of a receptacle portion providing a compartment therein, a closure for said receptacle to close the compartment thereof, a plunger head slidable in the receptacle compartment, a screw threaded stem connected with said plunger head and vertically extending in slidable relation through the said closure exteriorly of the receptacle compartment, standards supported in upwardly extending relation by the closure, an elongated guide frame carried by the upper ends of said standards extending in axially aligning relation with said screw threaded stem, said guide frame having a passageway therethrough into which the upper end of the screw threaded stem extends, means slidably connecting the screw threaded stem in said passageway of the guide frame to prevent rotation of the screw threaded stem, said guide frame being supported by said standard so that the lower end thereof is in spaced relation above said closure, a gear rotatably supported in screw threaded engagement with said screw threaded stem between the lower end of said guide frame and the closure in movable abutment with the closure and lower end of the guide frame to prevent relative movement therebetween longitudinally of the screw threaded stem, means for rotating said gear to feed the screw stem and plunger longitudinally of the receptacle, the lower end of said guide frame adjacent said gear, having a laterally extending bearing, a stub shaft rotatable in said bearing, a gear carried by said stub shaft in meshing relation with the teeth of the first mentioned gear, and means for rotating said second mentioned gear.

FLOYD PHARISS.